United States Patent
Offermans et al.

(10) Patent No.: US 11,480,642 B2
(45) Date of Patent: *Oct. 25, 2022

(54) SYSTEM AND METHODS FOR A PRIVATE ELORAN SERVICE

(71) Applicant: UrsaNav, Inc., North Billerica, MA (US)

(72) Inventors: Gerard Offermans, Bertem (BE); Stephen Bartlett, Tewksbury, MA (US); Charles Schue, Waterford, VA (US); Andrei Grebnev, Bedford, MA (US); John Allan, Tyngsboro, MA (US); Arthur Helwig, Milford, CT (US)

(73) Assignee: UrsaNav, Inc., North Billerica, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/345,948

(22) Filed: Jun. 11, 2021

(65) Prior Publication Data
US 2021/0302527 A1    Sep. 30, 2021

Related U.S. Application Data

(63) Continuation of application No. 16/326,481, filed as application No. PCT/US2017/049016 on Aug. 29, 2017, now Pat. No. 11,073,591.
(Continued)

(51) Int. Cl.
*G01S 1/24* (2006.01)
*H04W 12/04* (2021.01)
(Continued)

(52) U.S. Cl.
CPC ............... *G01S 1/24* (2013.01); *G01S 1/245* (2013.01); *H04L 9/0822* (2013.01); *H04W 12/02* (2013.01); *H04W 12/04* (2013.01)

(58) Field of Classification Search
CPC ............ G01S 5/10; G01S 5/12; H04W 12/00; H04W 12/06; H04W 12/069; H04W 64/00; H04L 9/0822; H04L 9/12; H04L 9/32
See application file for complete search history.

(56) References Cited

U.S. PATENT DOCUMENTS

| 5,745,037 A | 4/1998 | Guthrie et al. |
| 5,815,538 A | 9/1998 | Grell et al. |

(Continued)

FOREIGN PATENT DOCUMENTS

RU            155150 U1     9/2015

OTHER PUBLICATIONS

International Preliminary Report On Patentability in Corresponding Application No. PCT/US2017/049016, dated Aug. 21, 2018.
(Continued)

*Primary Examiner* — David S Huang
(74) *Attorney, Agent, or Firm* — Young Basile Hanlon & MacFarlane, P.C.

(57) ABSTRACT

A method for generating private eLoran signals includes receiving, by a transmitter that is configured to transmit a transmission at a fixed time, a transmission key; determining, by the transmitter, a pseudo-random transmission time for transmitting the transmission, where the pseudo-random transmission time is determined using the transmission key; and initiating transmission, by the transmitter, of the transmission at the pseudo-random transmission time. A receiving device includes a processor that is configured to obtain a pseudo-random time for receiving a transmission from a transmitter; receive the transmission at the pseudo-random time; and use the transmission to determine at least one of a time, a longitude, or a latitude at the receiving device.

20 Claims, 8 Drawing Sheets

Related U.S. Application Data

(60) Provisional application No. 62/381,454, filed on Aug. 30, 2016.

(51) Int. Cl.
*H04W 12/02* (2009.01)
*H04L 9/08* (2006.01)

(56) References Cited

U.S. PATENT DOCUMENTS

| | | |
|---|---|---|
| 2012/0194383 A1 | 8/2012 | Kawaguchi et al. |
| 2013/0127660 A1 | 5/2013 | Torimoto et al. |
| 2017/0372617 A1* | 12/2017 | Bruno .................. G08G 5/0039 |

OTHER PUBLICATIONS

PCT Written Opinion of the International Search Aurthority in corresponding Application No. PCT/US2017/049016, dated Nov. 30, 2017 (dated Nov. 30, 2017).
Extended European Search Report in corresponding European Patent Application No. 17847334.4, dated Apr. 24, 2020, 9 pgs.
Enhanced Loran (eLoran) Definition Document For Consulting-Comments to ILA by Apr. 1, International Loran Association, Jan. 12, 2007 (Jan. 12, 2007), pp. 1-17. XP055661868. [retrieved on Jan. 27, 2020].

\* cited by examiner

SYSTEM AND METHODS FOR A PRIVATE ELORAN SERVICE

CROSS-REFERENCE TO RELATED APPLICATION(S)

This application is a continuation of U.S. patent application Ser. No. 16/326,481, filed on Feb. 2, 2019, which claims priority to and the benefit of International Application Number PCT/US2017/049016, filed Aug. 29, 2017, which claims priority to and the benefit of U.S. Provisional Patent Application Ser. No. 62/381,454, filed Aug. 30, 2016, the entire disclosures of which are hereby incorporated by reference.

TECHNICAL FIELD

This disclosure relates to providing a private eLoran service.

BACKGROUND

Enhanced Loran (eLoran) Loran is an internationally recognized terrestrial complement system for positioning, navigation, and timing. It can be an alternative to satellite-based Global Navigation Satellite Systems (GNSS), such as GPS, GLONASS, and Galileo. In eLoran, the transmission times (e.g., of timing pulses) of a transmitter are fixed. The transmission time for each site can be calculated well into the future. An eLoran definition document can be obtained from the International Loran Association (http://www.loran.org) at http://www.loran.org/otherarchives/2007%20eLoran%20Definition%20Document-1.0.pdf. The eLoran definition document is incorporated herein by reference in its entirety.

SUMMARY

This application relates to a private eLoran service. Disclosed herein are aspects of systems, methods, and apparatuses for providing a private eLoran service.

A first aspect is a method for generating private eLoran signals. The method includes receiving, by a transmitter that is configured to transmit a transmission at a fixed time, a transmission key; determining, by the transmitter, a pseudo-random transmission time for transmitting the transmission, where the pseudo-random transmission time is determined using the transmission key; and initiating transmission, by the transmitter, of the transmission at the pseudo-random transmission time.

A second aspect is a system for transmitting private eLoran signals. The system includes an encoding unit configured to determine a pseudo-random transmission time for a transmission where the system is configured to transmit the transmission within a time slot, and where the pseudo-random transmission time is such that the transmission completes in the time slot; and a transmission unit configured to transmit the transmission at the pseudo-random transmission time.

A third aspect is a receiving device that includes a processor that is configured to obtain a pseudo-random time for receiving a transmission from a transmitter; receive the transmission at the pseudo-random time; and use the transmission to determine at least one of a time, a longitude, or a latitude at the receiving device.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
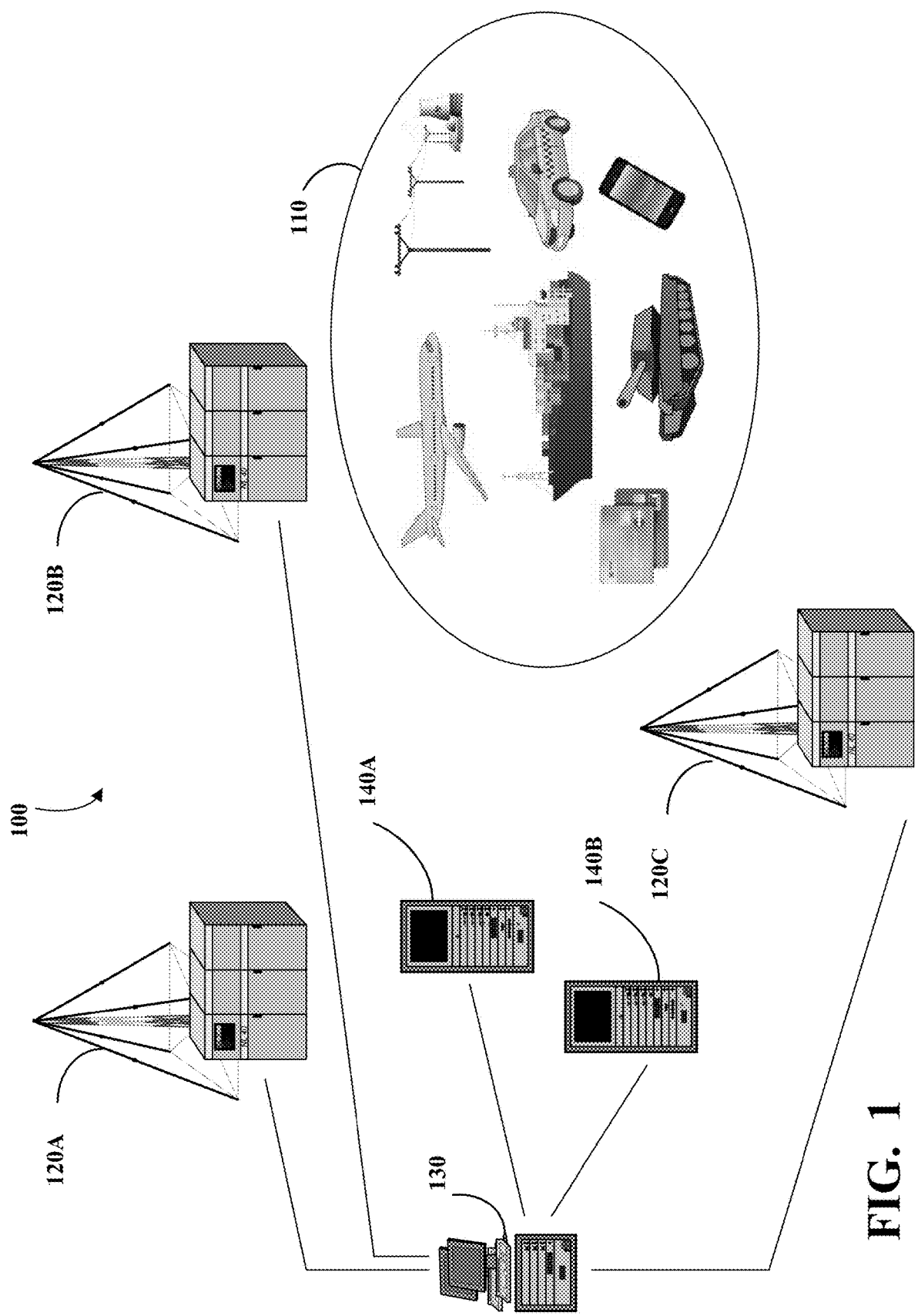
FIG. 1 is a diagram of a system of an eLoran environment.

Most of the critical infrastructure in the developed world is highly reliant on signals from satellites (e.g., GPS signals) for a synchronized precise time signal. This includes telecommunication systems, energy infrastructure, and the financial markets among many others. In addition, most modes of transportation including commercial aviation, emergency services, port operations and communications rely on this same service for location, navigation, and precise time.

Satellite signals are inherently low power and can be disrupted or otherwise made unreliable. There have been numerous documented examples of disruptions and the results therefrom of the loss of such satellite signals. A terrestrial alternative or backup to the public GNSS systems can be advantageous to mitigate against short term or multi-day loss, disruption, or compromise of satellite services, including timing, navigation, and positioning services that are based on satellite signals.

The methods and systems disclosed herein combine the low frequency timing and navigation service of eLoran and random signal transmissions from transmitters thereby providing timing and navigation pulses that can be resistant to disruption. Examples of disruptions include disruption resulting from jamming and/or spoofing. The private eLoran service can be provided to specified users such as, for example, authorized users or subscribed users. For example, authorized users can be equipped with capabilities enabling them to determine the specific transmission time of a signal from a transmitter. Authorized or subscribed users can be, for example, users provided with specialized eLoran receivers such that the receivers can determine the propagation time of signals from a transmitter wherein the transmission times are not fixed. For example, a transmitter and the receiver of an authorized user can be equipped with a same algorithm for determining transmission time. For example, the transmitter and the receiver can be equipped with a key, a seed of a pseudo-random generator, or parameters of another randomizing algorithm for determining transmission times of a transmitter. In an example, authorized or subscribed users can be users that can access the private eLoran service based on a commercial subscription agreement with an eLoran service provider. An authorized user can be a receiver device installed at a fixed location, on board a transportation vehicle such as a land-mobile vehicle (e.g., a car), a ship, or an airplane, or in a handheld device. The terms receiver and authorized user are used interchangeably herein, unless the context indicates otherwise.

Unlike the standard eLoran service, the timing pulses of a private eLoran service are not synchronized to an identifiable, publicly-certified, source of Coordinated Universal Time (UTC). "Not synchronized" in this context means that UTC synchronization can only be recovered by an authorized receiver. That is, an unauthorized user cannot use the signals to recover accurate UTC or position information. The transmission time of the timing pulses in a private eLoran service can be known only to authorized or subscribed users. As such, a private eLoran service can provide a precise timing and navigation signal only to the subscribed or authorized users (collectively, authorized users). To unauthorized users, the timing pulses of a Private eLoran transmitter appear random. Therefore, unauthorized users may be unable to acquire, track or use the signals from Private eLoran transmitters. Only authorized users can acquire, track and use the signal of the private eLoran transmission to determine time and position and/or use such signals for navigation.

In some implementations of Private eLoran, the phase code of the timing signals can be randomized to render Private eLoran signals unusable for an unauthorized user. The phase code of the timing signals can be randomized in addition to, or as an alternative to the random transmission time of the timing pulses. An authorized user can be preconfigured to identify a randomized phase code sequence. Alternatively, an authorized user can generate the sequence based on the Private eLoran key or seed. The unauthorized user (i.e., a user that does not know or cannot determine the sequence) cannot reliably acquire and track the Private eLoran signals without knowing the sequence. In an implementation, randomization of the transmission time of the timing pulses may be used with fixed or known phase codes. In another implementation, randomization of the phase code may be used together with randomization of the transmission time of the timing pulses. In another implementation, randomization of the phase code may be used with a known transmission time of the timing pulses.

FIG. 1 is a diagram of a system 100 of an eLoran environment. The methods and systems disclosed herein can be implemented, partially or completely, by one or more of the components of the system 100. The system 100 can include one or more transmitter sites 120, one or more monitoring sites 140, such as monitor site 140A-B, a control center 130, and one or more receivers 110. The system 100 is shown as including three transmitter sites 120 (i.e., transmitter sites120A, 120B, 120C), however the system 100 can include more or less transmitters.

The system 100 can provide a private eLoran service. The system 100 can additionally provide a non-private eLoran service. The non-private eLoran service can be referred to as an open-access service. Unless otherwise specified, the discussion herein focuses on the private eLoran service of the system 100. Only a receiver 110, who is an authorized user, can use the private eLoran service of the system 100, a transmitter site 120, or the data services of a private eLoran service. In an implementation, the system 100 can at the same time provide a restricted private eLoran service to authorized users and an open-access eLoran service to all users. Unless otherwise specified, the terms system, private eLoran system, and private eLoran refer to the system 100.

The system 100, by providing a private eLoran service, can be even more resistant to jamming, spoofing, and/or interference than standard eLoran due to the innovative features described herein. For example, signals transmitted by the system 100 do not have a priori known relationship to UTC for non-authorized users. The system 100 can transmit signals within the same eLoran-assigned 90-110 kHz frequency band and can coexist with normal eLoran services. In an implementation, private eLoran-like signals can be transmitted in another frequency band, such as the 280-330 kHz frequency band, a 400 KHz frequency, 500 KHz frequency, or another band of similar frequency.

Figure 2:
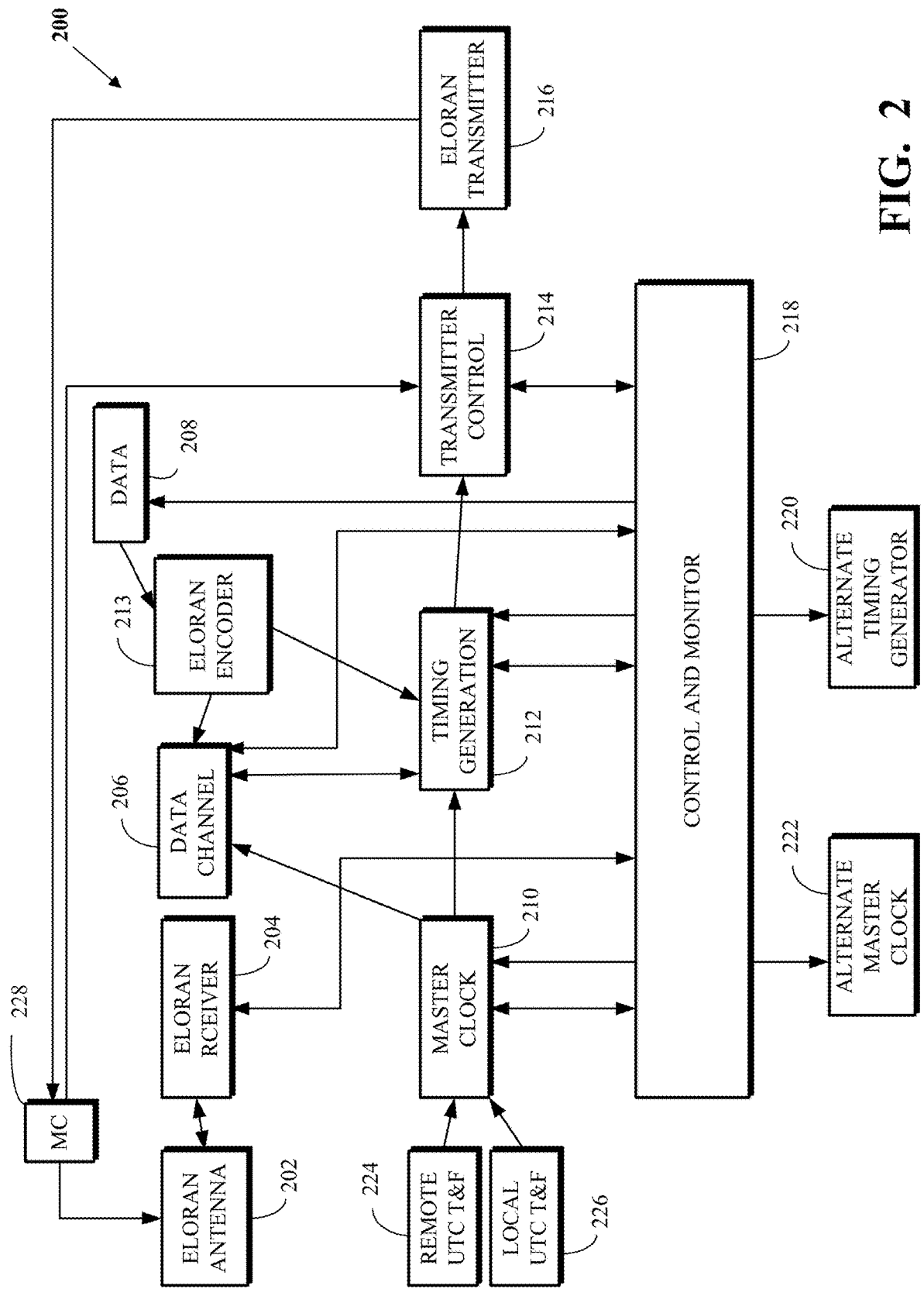
FIG. 2 is a functional block diagram of a system that can drive an eLoran transmitter.

FIG. 2 is a functional block diagram of a system 200 that can drive an eLoran transmitter. Components of the system 200 can implement the teachings of this disclosure to provide a private eLoran service. The system 200 is an eLoran Signal Generation, Monitor and Control System that can provide all timing signals, data, monitor and control functions needed to drive an eLoran transmitter.

The system 200 can include an antenna 202, a eLoran receiver 204, a data channel generator 206, a Third-party data 208, a master timing reference 210, a eLoran timing generator 212, an eLoran encoder 213, a transmitter control 214 (i.e., a transmission unit), a transmitter 216, a monitor and control unit 218, an alternate timing generator 220, an alternate master clock 222, a remote UTC 224, a local UTC 226, and an antenna multi-coupler and blanker 228. The monitor and control unit 218 can be one or both of the monitoring site 140 and the control center 130 of FIG. 1. All other components of the system 200 can be encompassed in a transmitter site, such as the transmitter site 120 of FIG. 1. As such, and unless otherwise specified or is clear from the context, a reference to a transmitter site means those components of the system 200 encompassed in a transmitter site.

The eLoran encoder 213 (i.e., the encoding unit) generates the transmission keys as described herein. The eLoran encoder 213 can be used to generate the random delays based on the transmission key. The random delays generated by the eLoran encoder 213 can be used by the eLoran timing generator 212 to determine a timing for transmitting private eLoran signals. The transmission keys generated by the eLoran encoder 213 can be transmitted via an LDC message generated by the data channel generator 206 to receivers. The eLoran encoder 213 can be configured to automatically generate new transmission keys based on a configuration provided by the service provider. For example, the service provider can set a rule, a policy, a configuration, or the like, such that transmission keys are valid for a certain amount of time (e.g., 1 hour). As such, the eLoran encoder 213 can generate new transmission keys every the certain amount of time. Other transmission key validity policies can be set by the service provider. For example, the transmission keys can be configured to expire at certain times. The eLoran encoder 213 can, additionally or alternatively, be configured to generate transmission keys on demand. For example, the eLoran encoder 213 can receive commands to generate new transmission keys from the monitor and control unit 218.

The eLoran encoder 213 can encode messages from the Third-party data 208 which are to be transmitted via LDC message. The eLoran encoder 213 can cause the timing generator 212 to transmit at the pseudo-random times. That is, the eLoran encoder 213 can determine (for example, as described with respect to FIG. 4) when the timing generation 212 is to trigger the transmission of a private eLoran signal.

Components of the system 200 can provide functions including a timing chain function, a data channel function, a signal integrity function, a monitor and control function, and a system fault monitor function. Functional Specifications of some of the five primary functions of the system 200 are described below in more detail. Functions may be distributed over multiple sets of equipment.

Timing Chain Function

The timing chain function can provide the timing trigger signals to the transmitter 216 at the exact time the transmitter 216 is to broadcast the eLoran pulses. The timing chain can maintain a local version of UTC, via the local UTC 226, which can be synchronized to external UTC sources by one or multiple synchronization methods. For example, the remote UTC 224 can be used to synchronize the local UTC to an external UTC source. The timing chain can employ multiple Primary Frequency Reference Standards (PFRS) to provide the stable frequency that the UTC and timing signals distribution will be based upon. Additionally, the timing chain can modulate the timing triggers according to standardized Loran Data Channel (LDC) specifications. For example, the system 200 may be able to support one or more LDC standards. In an example, the system 200 can be configured to simultaneously or individually support one or both of the tri-state pulse position modulation and the 9th pulse modulation LDC standards. The system 200 can drive an eLoran transmitter (i.e., the transmitter 216) at two rates (dual-rate operation). The timing chain can provide timing signals for both rates including LDC, prioritizing one rate in case of overlapping transmission windows.

As indicate above, eLoran transmissions are synchronized to Universal Coordinated Time (UTC) and the system 200 can maintain its own version of the UTC. The master timing reference 210 can maintain the local version of the UTC. The master timing reference 210 can receive frequency inputs from one or more PFRS. The PFRS signals can be ensembled to provide the best possible frequency output aligned to UTC. An ensembling algorithm can factor the long term stability of the PFRSs. The master timing reference 210 can interface with each PFRS for monitoring and control. The master timing reference 210 communicates with the PFRSs via a communication interface set (not shown), which can switch control depending on the online status of the master timing reference 210.

The master timing reference 210 can generate a UTC-aligned frequency reference. The frequency reference can be based on the ensembled frequency inputs from all connected PFRSs. The master timing reference 210 can distribute the frequency outputs to all equipment in need of the UTC aligned frequency.

The master timing reference 210 can output a local UTC Time Scale, provided as a 1 pulse per second (1 PPS), a UTC data message, and stable frequency. That is, the master timing reference 210 can generate a UTC aligned 1 pulse per second output (1 PPS).

In an implementation, the master timing reference 210 can host a timing server. The timing server can be one or more servers that provide one or more of network time protocol (NTP) or precision time protocol (PTP). The timing server can be used to synchronize computer-based equipment, such as equipment in a transmitter site 120. Additionally, the master timing reference 210 can distribute the 1 PPS outputs to all equipment that require the local UTC Time Scale.

The transmitter 216 transmits pulses of well-defined shape at well-defined times, according to the Signal-in-Space (SIS) definition. The timing chain can generate the trigger pulses that the transmitter 216 requires to generate the eLoran pulses at exactly the right time. The eLoran timing generator 212 can receive the UTC information from the master timing reference 210 and can calculate the correct trigger moments for the transmitter 216 for one or two rates (dual-rate operation) within their designated time slot.

The eLoran timing generator 212 can receive a 1 PPS and an aligned frequency both synchronized to the local version of UTC, and a UTC message providing the exact UTC time information. The eLoran timing generator 212 can receive a copy of a signal transmitted by the transmitter 216 through the antenna multi-coupler and blanker 228. The eLoran timing generator 212 can use the received signal to, for example, measure the exact phase of the $6^{th}$ zero crossing (UTC point) and determine delays of the transmitter 216. As such, the eLoran timing generator 212 can adjust its triggers and can slew the frequency in a closed loop.

The eLoran timing generator 212 can modulate the triggers according to the modulation provided by the data channel generator 206. The LDC formats referred to above (i.e., tri-state pulse position modulation and the 9th pulse modulation) apply pulse position modulation. As such, the eLoran timing generator 212 can change the time of a trigger of a modulated pulse according to the data being sent and the LDC specification. The eLoran timing generator 212 can send triggers to the data channel generator 206 to signal the beginning of a group, the beginning of a message or both. The data channel generator 206 can generate all modulation patterns required to send the next available message on the Loran Data Channel.

Data Channel Function

As described above, the data channel generator 206 can support one or more Loran Data Channel (LDC) standards. For example, the data channel generator 206 can support one or both of the Tri-state pulse position modulation and $9^{th}$ pulse modulation standards.

Tri-state pulse position modulation modulates 6 out of 8 Loran pulses with a one (1) us modulation index, without noticeably affecting the timing or positioning performance of a user receiver. This LDC provides a raw seven (7) bits of information per Loran group of eight pulses. $9^{th}$ pulse modulation adds an LDC pulse in the ninth timeslot (right after the standard eight pulses). The pulse is pulse position modulated in 32 positions resulting in a raw five (5) bits of information per pulse. Both LDC types can apply error correction techniques, such as Reed-Solomon forward error correction, to make the LDC robust and fault tolerant. The data channel generator 206 can add more than one LDC pulse per Loran group according to the same $9^{th}$ pulse modulation format or using different modulation to increase LDC data bandwidth or provide additional broadcast communication channels (i.e. $10^{th}$ pulse).

The Loran Data Channel can generate data for different purposes. The data channel generator 206 can, for example, generate system specific data, such as Site (i.e., transmission site) health, UTC messages, and Differential Corrections. The data channel generator 206 can also broadcast non-eLoran data such as, Differential GNSS and GNSS integrity information, Short Message Service (i.e., emergency messages), and Third-Party data. The LDC can also be used as a channel for exchanging transmitter control and/or timing-related information for monitoring other transmitter sites (i.e., transmission sites).

The LDC can be organized in such a way that it can interleave messages for different services. The message stream has fixed length messages and may be synchronized to UTC. Some information is generated locally; other information is transferred to the transmitter site from remote locations.

The data channel function consists of several tasks including on-site data content generation (e.g., UTC, STATID, HEALTH, SMS, GRI CONTROL), remote data content interface (e.g., DLORAN, DGNSS, THIRD PARTY, SMS), message scheduling, Eurofix data formatting and modulation, 9th/10th pulse data formatting and modulation, and high-speed data channel. These tasks are provided and/or implemented by the data channel generator 206.

The data channel generator 206 can gather information needed for a specific service and format, encode, modulate, and schedule the messages for broadcast on one of the enabled LDC channels. Information contained in the LDC messages can be generated on-site (i.e., on-site data content generation) or can originate from outside the transmitter space (i.e., remote data content).

For information generated on-site, the data channel generator 206 can interface (e.g., communicate) with various pieces of equipment to gather data. Examples of on-site data content generation include eLoran control messages and the UTC Service messages.

eLoran Control Messages

As part of the control of a system of transmitters (i.e., transmitter sites 120 of FIG. 1), LDC messages can be used to provide control data for remote transmitters, both as primary or back-up communication means. Two Way Low Frequency Time Transfer (TWLFTT) can be used to collect measurements at two or more transmitter sites at one (e.g., central) location for the calculation of the UTC timing offset between transmitter sites. The LDC can facilitate the exchange of such information, as well as the control action required to synchronize a remote transmitter to the eLoran system time. Control messages can be provided as a separate LDC type (with sub-types). LDC messages can have respective message types. The message type of a message can be prepended to the message or can be included in a header of the message. The data channel generator 206 can interface with the eLoran receiver 204, the master timing reference 210, and monitor and control unit 218 to acquire such information.

UTC Service

UTC messages broadcast by the LDC communicate information which allows an eLoran receiver to determine date and time of day from the LDC and the accurate time of transmission of the eLoran pulses. The data channel generator 206 can interface with the master timing reference 210 to receive UTC time and date associated with a 1 PPS strobe, and interface with the eLoran timing generator 212 to receive the triggers (which indicate the start of an eLoran group or LDC message). Based on this information, the data channel generator 206 can synchronize the LDC message broadcast to UTC and provide information for the UTC message service.

Remote Data Content Interface

In addition to data generated on site, the Loran Data Channel can also carry (i.e., communicate to a client receiver) information originating outside the transmitter site. For example, the data channel generator 206 can receive, from the Third-party data 208 and via the eLoran encoder 213, information to be communicated, via one or more LDC messages, to a client receiver. The Third-party data 208, in the case of private messages, may be encrypted before being passed to the data channel 206.

Depending on the source of the data (i.e., the Third-party data 208), the connection into the data channel generator 206 can require additional security. For example, Data from within the eLoran Operational Data Network can be distributed through a Virtual Private Network (VPN) to provide, for example, security, encryption and access restrictions. In another example, data from outside the eLoran network can be interfaced through a secure public protocol, such as HTTPS://. VPN and public HTTPS traffic can enter the transmitter site through an eLoran Gateway (not shown). The eLoran Gateway can be collocated with the data channel generator 206. Examples of remote data content include Tthird-party data client messages. The eLoran Operational Data Network refers to the service (i.e., eLoran) provider's telecommunication network that provides a data link between reference sites, transmitter sites, and the control site.

Third-Party Data Client Messages

The Loran Data Channel can be organized in such a way that different services, with different priorities and update rates, can be interleaved on the same LDC. In general, the eLoran system-specific messages require a limited bandwidth where the required update time is primarily dominated by the user's acquisition time. Spare capacity on the LDCs can be used to provide Third-party data for, e.g., special governmental or commercial services over large areas. The eLoran Gateway can be configured to accept Third-Party Data Client messages in a pre-formatted way. As such, the data channel generator 206 can encode, modulate, and schedule the messages without the need to know the message content or format, providing a transparent and secure broadcast channel to the Third-Party Data Client.

Message Scheduling

The LDC messages generated by the data channel generator 206 can have fixed length and can be synchronized with UTC. To maintain message synchronization, the LDC message stream can be continuous. As such, the LDC transmission time slots can be pre-organized with UTC time according to implementations of this disclosure, and a next-message to broadcast can always be available. Once a message broadcast is started, the broadcast is not interrupted. Message time slots can be scheduled according to message priorities. The data channel generator 206 can maintain a message queue for transmission according to priority. The message with the highest priority gets precedence over other messages. In case the message queue is empty, default messages (such as UTC, Site ID/Health or Almanac messages) can be transmitted.

Messages can be submitted to the message queue for immediate, scheduled or low priority broadcast. In an example, messages of high priority services (such as site health (in case of changed status), alarm or integrity messages) have precedence over other messages. In case of priority override of pre-scheduled messages, messages can be rescheduled. The eLoran Gateway protocol can allow for different types of priority and (re)scheduling. In the case of private eLoran messages, eLoran Encoder 213 can encrypt the messages before passing them to the data channel 206.

Tri-State PPM Data Formatting and Modulation

The data channel generator 206 can include functionality to format, encode and translate LDC messages into modulation patterns according to the specification of tri-state pulse position modulation. The data channel generator 206 can interface with the eLoran timing generator 212 to communicate the modulation for the next group of eLoran pulses, or next message. Further, the data channel generator 206 can monitor the transmitted modulation by comparing the received (and demodulated) pulses with the modulation patterns provided for transmission.

9th/10th Pulse Data Formatting and Modulation

Similar to the previous section, the data channel generator 206 can include functionality to format, encode and translate LDC messages into modulation patterns according to the specification of the $9^{th}$ pulse LDC format. A $10^{th}$ (or higher) pulse LDC can employ the same format in a corresponding eLoran pulse time slot and can adhere to the same modulation and message format standards. The data channel generator 206 can interface with the eLoran timing generator 212 to communicate the modulation for the next message. Further, the data channel generator 206 can monitor the transmitted modulation by comparing the received (and demodulated) pulses with the modulation patterns provided for transmission.

Monitor and Control Function

Some implementations of the system 200 can provide monitoring and control as a necessary but non-critical function. As such, transmissions can continue even in case of a malfunction of the monitor and control unit 218. Subsystems (e.g., the eLoran receiver 204, the data channel generator 206, the eLoran timing generator 212, etc.) of the system 200 can provide regular status and measurement data to the monitor and control unit 218. Subsystems of the system 200 can receive configuration and control commands from the monitor and control unit 218. Status and measurement data can be gathered and displayed at an eLoran Site Server. For example, the status and measurement data can be displayed at a control center (such as the control center 130 of FIG. 1) and/or at one or more of the monitoring sites 140. The Monitor and Control function provides the interface from which, e.g., the transmitter 216 and other components of the system 200 can be remotely monitored and controlled.

Figure 3:
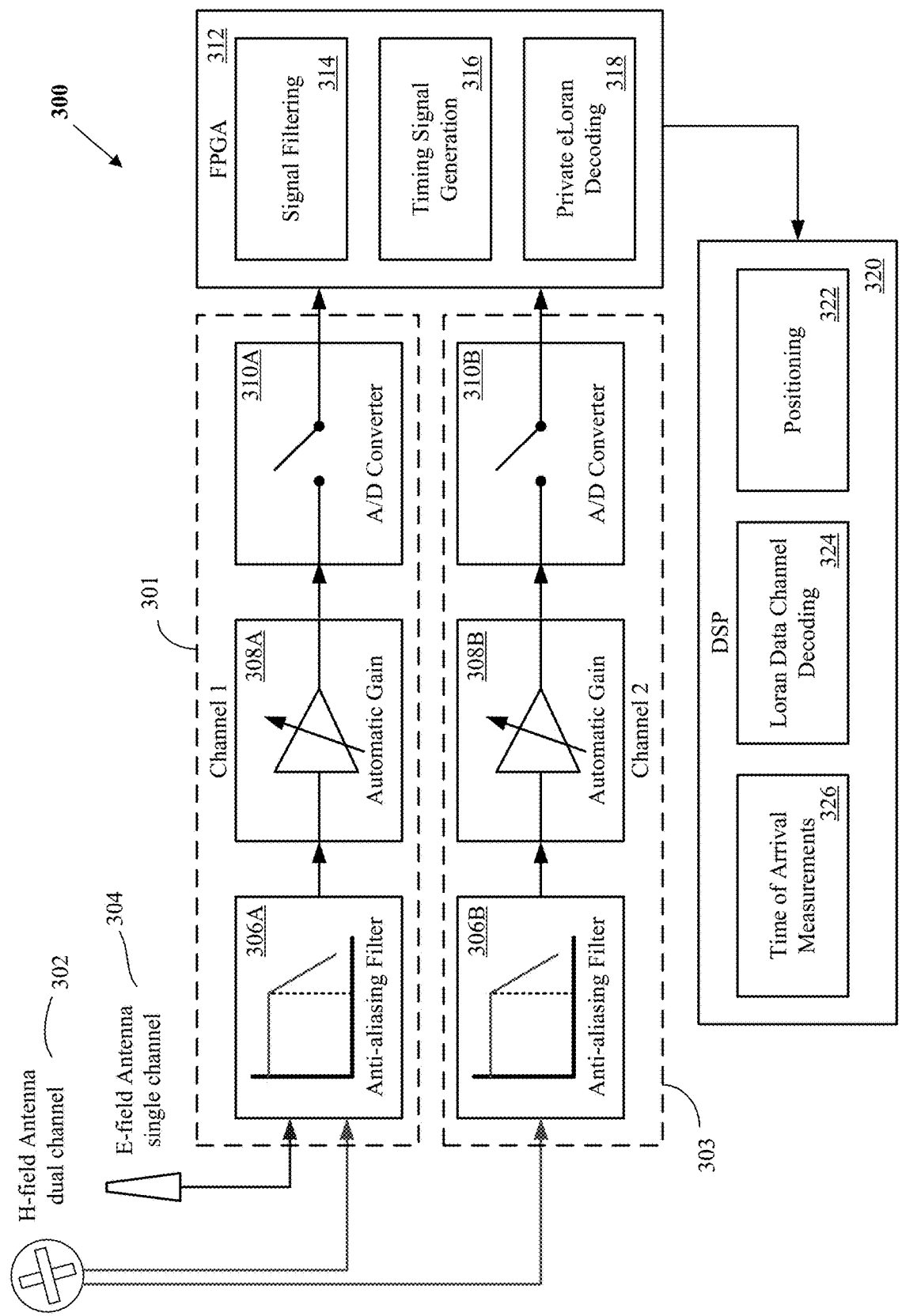
FIG. 3 is a block diagram of an example of an eLoran receiver according to implementations of this disclosure.

FIG. 3 is a block diagram of an example of an eLoran receiver 300 according to implementations of this disclosure. The eLoran receiver 300 can include one or more antennas. The antennas can be of different types. The eLoran receiver is shown as including an electric field antenna 304 and a magnetic field antenna 302. An antenna can be a single or a multi-channel antenna. For example, the magnetic field antenna 302 is a dual channel antenna. The eLoran receiver 300 is shown as being a multi-channel component and includes a channel 301 and a channel 303 for receiving and processing signals. However, a receiver can include more or less channels for receiving signals. An analog signal received from an antenna can be processed through an Anti-aliasing filter 306.

The anti-aliased signal can then be amplified by an automatic amplifier (or gain controller) 308. The amplified signal can then be sampled via an analog to digital converter 310 to generate a digitized signal. The digitized signal can then be processed in, for example, a Field Programmable Gate Array (FPGA) 312. The FPGA 312 can provide various kinds of signal filtering. In the example shown, the FPGA 312 includes a band-pass and notch filter 314 that removes noise and interference from the signal, a private eLoran decoding filter 318, and a timing signal generation filter 316 that can measure the timing of pulses in the signal. Any information generated by any of the FPGA 312 can then be passed to a Digital Signal Processor (DSP) 320. The DSP 320 can measure the time of arrival of the transmitted pulses via component 326. The DSP 320 can also decode the data transmitted via the LDC via component 324. The DSP 320 can determine a position of the eLoran receiver 300 via component 322. In some embodiments, some all or all of the functionality of the DSP 320 can be provided by the FPGA 312. In some embodiments, the FPGA 312 can include the DSP 320. The private eLoran decoding filter 318 can decode, using the encryption key, encrypted LDC messages. An encrypted LCD message is described with respect to FIG. 5. For example, the private eLoran decoding filter 318 can decrypt an encrypted LCD message to extract a transmission key, such as a transmission key described with respect to FIG. 4. For example, the private eLoran decoding filter 318 can search the signal space for an eLoran signal. Once an eLoran signal is acquired, an LDC message can be acquired. For example, the private eLoran decoding filter 318 can be used to receive signals at the pseudo-random times described with respect to FIG. 4. Some of the functions of the private eLoran decoding filter 318 can be implemented in other components which may not be part of the FPGA 312.

While not shown in the FIG. 3, the eLoran receiver 300 can include components and interfaces associated with computing devices. For example, the eLoran receiver 300 can include one or more memory modules for storing data and/or instructions, one or more processors that can execute instructions stored in the memory and/or in firmware. The eLoran receiver 300 can include components that can enable human interactions, such as an input interface (e.g., a keyboard) and a display interface (e.g., a screen). The eLoran receiver 300 can include components that can enable network or device communication, such as a network interface component.

Figure 4:
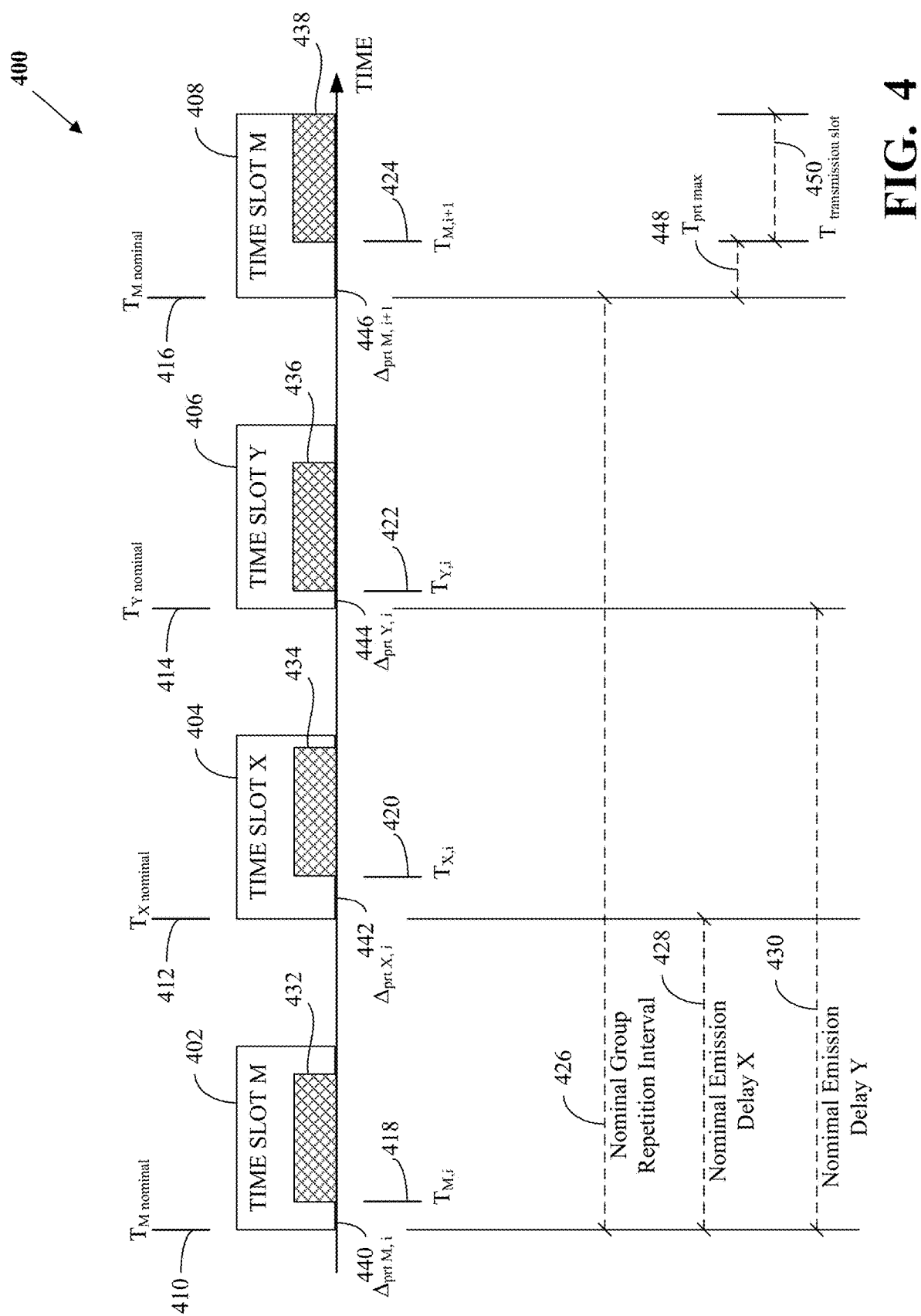
FIG. 4 is an illustration of a timeslot sequence of private eLoran according to implementations of this disclosure.

FIG. 4 is an illustration of a timeslot sequence 400 of private eLoran according to implementations of this disclosure. As described above, in a system, such as the system 100 of FIG. 1, which provides a private eLoran service, the signals from a transmitter, such as the transmitter 216 of a transmitter site 120 of FIG. 1, does not have a known and usable relationship to UTC for unauthorized users. A next transmission slot for a transmitter site 120 cannot be predicted by an unauthorized user based on the (sequence of) previous signals from a transmitter site 120.

In eLoran, each transmitter site can have its own phase code to identify and each transmitter site 120 can be identified independently from any other transmitter site 120. The phase code of a transmitter can be such that multi-hop skywaves are rejected (e.g., no or limited correlation between a pulse and its successor in the group). In an implementation, the private eLoran system can use randomized phase codes. For simplicity, the traditional Loran-C slot designators M, X, Y, etc. are used in FIG. 4.

In an eLoran implementation, two or more transmission sites can be grouped into a group repetition interval (GRI), as further explained below. A receiver, such as the eLoran receiver 300 of FIG. 3, can receive signals from the transmitters of a GRI. Each transmitter site in the GRI emits groups of pulses at well-known times. After each transmission site in the GRI transmits its signals, the process repeats. FIG. 4 illustrates three transmitter sites in a GRI, namely a transmitter site (referred to as transmitter) M, a transmitter X, and a transmitter Y.

In a non-private eLoran system, the transmitter M starts transmission at time 410, followed by the transmitter X transmission at time 412, and followed by transmission of transmission Y at time 414. The pattern repeats with the transmitter M transmitting at time 416. The time interval between the start of a transmission of a transmitter in a GRI until the start of the next transmission of the same transmitter is known as the group repetition interval (GRI) as indicated by time 426.

The transmission of a transmitter completes in an allotted time slot. For example, the transmissions of the transmitter M complete within time slots 402 and 408, the transmission of the transmitter X completes in timeslot 404, and the transmission of the transmitter Y completes in timeslot 406.

An emission delay (ED) can be associated with a transmitter site in a GRI. The emission delay of a transmission site is the time between the start of a first transmission site in a GRI and the start of transmission of the transmission site. For example, the emission delay of the transmitter X with respect to the first transmitter M of the GRI is indicated by the emission delay 428 and the emission delay of the transmitter Y with respect to the first transmitter M of the GRI is indicated by the emission delay 430.

A guard time is a time between the expected end of a transmission of a transmitter and the start of a transmission of the next transmitter in a GRI. The guard time can ensure that all signals from a transmitter propagate to the user (i.e., a receiver) or are sufficiently decayed before the receiver starts to receive pulses from the next transmitter in the GRI. Guard times between any two consecutive transmissions from two transmitters in the group can ensure that the signals from the two transmitters do not overlap at any receiver at any location in the coverage area.

In a private eLoran service according to implementations of this disclosure, the GRI and EDs do not conform to the above description. For internal bookkeeping (in a receiver 110 and at a transmitter site 120 of FIG. 1) a transmitter site 120 may each maintain a nominal group repetition interval "nominal GRI" or NGRI (i.e., the time 426) with respect to which the timing of the timeslots for a transmitter site 120 is synchronized. The nominal GRI is a transmitter's internal knowledge of its exact transmission time were it supposed to be operating in standard eLoran mode (i.e., as described above). The emission delays are also nominal emission delays. As such the emission delay 428 is a nominal emission delay of transmission X (i.e., NEDx) and the emission delay 430 is a nominal emission delay of transmission Y (i.e., NEDy). Emission delay may also be referred as transmission delay. A transmitter site can operate in one or more GRIs. Each of the GRIs that a transmitter site operates in can have a respective different nominal group repetition intervals (NGRI).

The observed delays between time slots for one transmitter site 120 can be longer than a synchronous GRI-based eLoran time slot allocation thereby adding transmission randomness. The randomness can add additional delay in starting a subsequent transmission, such as a next transmission, from a transmitter. The delay can make the intervals between time slots longer, taking into account the guard times and propagation of signals from one to the next transmission. Whereas in a standard Loran-C service, timing intervals are constrained within the range of 30 to 100 milliseconds, in a private eLoran service, the delay can exceed the 100 millisecond standard maximum boundary of Loran-C.

As described above, the traditional Loran-C slot designators M, X, Y etc. are used herein to illustrate the Pseudo-Random Transmission Slot Allocation (PRTSA) of private eLoran. In this context, "Pseudo-Random Transmission Slot Allocation" means any randomizing algorithm such that the transmission time cannot be predicted by an unauthorized user, but can be determined by authorized users, who know the algorithm and/or the algorithm parameters.

In FIG. 4, transmission time slot 450 ($T_{transmission\ slot}$) is the length of a transmission slot. The transmission of timing and data pulses can require up to $T_{transmission\ slot}$ to complete. For example, within the time slots 402-408, transmission requires transmission time slots 432, 434, 436, and 438, respectively. Random time offset 448 ($T_{prt\ max}$) is the maximum size of the pseudo-random time offset. That is, the random time offset 448 is the maximum delay of a start of a transmission such that the transmission can still complete within the allocated time slot, such as the time slots 402-408. $T_{M\ nominal}$ indicated by the time 410 is the nominal start time of transmission slot for transmitter M. $T_{X\ nominal}$ (indicated by the time 412) is the nominal start time of transmission slot for transmitter X. $T_{Y\ nominal}$ (indicated by the time 414) is the nominal start time of transmission slot for transmitter Y. Times of the form $T_{A,x}$ indicate the start time of secret transmission slot of transmitter A of transmission number x. For example, $T_{M,i}$ (indicated by time 418) illustrates the start time of secret transmission slot for transmitter M of the transmission number n (where i=0, 1, 2, . . . ); $T_{X,i}$ (indicated by time 420) illustrates the start time of secret transmission slot for transmitter X of transmission number n; $T_{Y,i}$ (indicated by time 422) illustrates the start time of secret transmission slot for transmitter Y of transmission number n; and $T_{M,i+1}$ (indicated by time 424) illustrates the start time of secret transmission slot for transmitter M of transmission number (n+1). $\Delta_{prt\ M,i}$ (indicated by time 440) is a pseudo-random time offset for transmitter M of transmission number n. $\Delta_{prt\ X,i}$ (indicated by time 442) is a pseudo-random time offset for transmitter X of transmission number n. $\Delta_{prt\ Y,i}$ (indicated by time 444) is a pseudo-random time offset for transmitter Y of transmission number n. $\Delta_{prt\ M,i+1}$ (indicated by time 446) is a pseudo-random time offset for transmitter M of transmission number i+1.

The nominal times described above (e.g., $T_{X\ nominal}$) are virtual transmission times or reference times. The nominal times are not actual transmission times for private eLoran. The nominal times can be the times that a non-private normal eLoran transmitter site starts transmissions. As such, the nominal times can be part of the configuration of a transmitter site (i.e., a non-private and/or private eLoran system).

While in the description herein, the start time of secret transmission (e.g., the times 418-424) are shown in FIG. 4 and described as being "after" the nominal times (e.g., the times 410-416), "after" in this context can mean a "time different." As such, a nominal time (e.g., $T_{X\ nominal}$) can be selected later on the time axis such that the start time of secret transmission is a time before or after the nominal time. That is, a random offset can be negative and positive with respect to a nominal transmission time.

In the system 100, each transmitter site 120 can be assigned a time slot. This time slot can repeat according to the nominal group repetition interval (NGRI). The Time Slot can be larger than the length of the transmission slot ($T_{transmission\ slot}$), which can be the minimum time required to broadcast the sequence of timing pulses and Loran Data Channel (LDC) pulses. The length of the time slot can be extended by a time swing allowed to encrypt the timing signals ($T_{prt\ swing}$). As system 100 can have a large number of transmitter sites 120 in one GRI with the same NGRI. The NGRI can be larger than the Loran-C limit of 100 milliseconds (ms). In an implementation, the NGRI can be selected to be as small as possible based on the number of transmitter sites 120, pseudo-random time swing, baseline propagation delays, and guard times.

The actual start time of a transmission slot can be offset by a pseudo-random time offset ($\Delta_{prt}$). In an implementation, the pseudo-random time offset can be positive and can be calculated by the transmitter site 120. The pseudo-random time offset can also be calculated by a receiver, such as the receiver 110 of FIG. 1 or the eLoran receiver 300 of FIG. 3, based on a Pseudo Random Generator (PRG). The PRG calculates a value based on a seed value. The seed value (PRG seed) can be used to set a starting value for generating a sequence of pseudo-number time values. In an implementation, the PRG seed can be broadcast through encrypted LDC messages to receivers, such as the receiver 110. In an implementation, the PRG seed can be encoded into a receiver, such as in firmware of a receiver. In an implementation, the PRG can be provided to a receiver at configuration or setup time. In an implementation, a receiver can receive the PRG seed upon connection to a network. In an implementation, the network can be a secure network or a virtual private network. Each transmitter can calculate its own pseudo-random time offset for a transmission. The offset $\Delta_{prt\ M,i}$ (i.e., the time 440) of the i'th transmission of transmitter M can be calculated using equation 1:

$$\Delta_{prt M,i} = \Delta_{prt M,start} + PRG_M(i) * \Delta_{prt swing} \qquad (1)$$

In equation 1, $\Delta_{prt\ M,start}$ is the start offset, which can be communicated through the LDC; $\Delta_{prt\ swing}$ is the maximum size of the random part of the swing; and PRGM(i) is the Pseudo Random Generator number for index i. PRGm(i) can be a value in the interval [0,1]. $\Delta_{prt\ M,start}$ and $\Delta_{prt\ swing}$ can be chosen in such a way that $\Delta_{prt\ M,i} < T_{prt\ max}$ for all i. The start offset $\Delta_{prt\ M,start}$ can remain the same until the next update of the PRG seed. As further explained below, the start offset $\Delta_{prt\ M,start}$ can be used to inject additional randomness or pseudo-randomness into the eLoran service in order to make the offset $\Delta_{prt\ M,i}$ have a non-predictable mean over long periods of time. As such, a non-authorized user is unable to, e.g., average the $A_{prt\ swing}$, over very long times and potentially make use of the private eLoran signal in some way.

In an implementation, a parameter $\Delta_{prt\ M,\ start}$ can be introduced to ensure that unauthorized users cannot determine $T_{M,0}$, which is the UTC synchronization time of the transmissions, not even after very long integration. $\Delta_{prt\ M\ start}$ can change when a new PRG seed for the Pseudo Random Generator is communicated through the encrypted LDC. The PRG algorithm can be chosen such that its distribution is not distinguishable from a uniform distribution U over [0,1]. The minimum swing step size of the Private eLoran system can be determined based on transmitter capability of generating micro delays (for example 10 ns), the maximum offset $T_{prt\_max}$ (i.e., the random time offset 448) can be chosen as a function of a level of obscurity desired for the Private eLoran system. The level of obscurity can provide a level of degradation to the accuracy of the timing determination (similar to the GPS Selective Availability). An erosion of the timing determination in turn leads to positional accuracy erosion. In an example, the level of obscurity (i.e., positional accuracy) can be 100 meters. In other examples, the desired positional accuracy may be less or more. The random time offset 448 (i.e., the maximum offset $T_{prt\_max}$) can be 1 µs, 10 µs, 1 ms, or any other value. In an example, the maximum offset $T_{prt\_max}$ can be a complete NGRI period, larger than a NGRI period, or have some other relation to the NGRI.

In an implementation, the secret transmission slot for a transmitter A (i.e., the exact transmission times for a transmitter A, where transmitter A is one of the transmitters M, X, or Y), for any interval i, can be determined according to equation 2:

$$T_{A,i} = T_{A\ nominal} + \Delta_{prt\ A,i} \qquad (2)$$

In equation 2, $T_{A,i}$ is as described above with respect to the times 418-424, $\Delta_{prt\ A,i}$ is as described above with respect to the times 440-446 and for example equation 1, and $T_{A\ nominal}$ is as described above with respect to the times 410-416. TA nominal can be calculated by equation 3:

$$T_{A\ nominal} = n * NGRI + NED_A \qquad (3)$$

$NED_A$ is the nominal emission delay of transmission state A as described above with respect the emission delays 428 and 430. Herein, the emission delays are referred to as "nominal" emission delays because transmissions do not occur according to these emission delays in a private eLoran system. In equation 3, n can be the number of NGRIs passed since the UTC synchronization time of the system which is the UTC time the system's first transmitter slot is synchronized to (e.g. Jan. 1, 1958, 00:00 hours UTC for Loran-C). The synchronization time can be set differently for a system 100 that is a Private eLoran system (for instance Jan. 1 2000, or any other date). The synchronization time can be transmitted or provided to the authorized receiver 110. LDC messages can provide UTC reference of the current signals. An authorized receiver 110 can synchronize its clock to UTC using the eLoran signals and LDC based on information provided in the LDC. In an implementation, n can be transmitted in the LDC to provide the UTC reference of the current signals. In an implementation, the number of LDC messages passed since the start of the system's UTC synchronization can be transmitted to provide the UTC reference of the current signals.

The PRTSA provides several benefits including, but not limited to:

Combating synchronous interference: Since there is no synchronicity in the time slots, synchronous interference can be avoided.

2) Jam- and spoof-proof signals: The PRTSA can make a Private eLoran Service more difficult to jam and nearly impossible to spoof by unauthorized users. A high-power jammer such as a Loran capable high-power transmitter (e.g.,1 MW located at some standoff) may not be able to jam or spoof a system 100 using the same Loran-like pulses as such a high-power jammer cannot know the transmission slots without the keys (e.g., the transmission key). Additionally, the correlation gain of the phase code can provide advantage over the jamming signal. In some implementation, the phase code can also be randomized as described above.

LDC Design

Described now are aspects and capabilities of the data channel generator 206.

Modulation Layer: Modulation in the private eLoran system can adhere to the 32-level Pulse Position Modulation defined in the $9^{th}/10^{th}$ pulse definition. In an example, two LDC data pulses can be transmitted per timeslot. In an example, more than two LDC pulses can be transmitted per timeslot. The LDC data pulses can be consecutive. Alternatively, the LDC data pulses can be interleaved with the timing pulses. Other number of data pulses and transmission sequences can be possible. In an implementation, the data pulses can constitute two 5-bit symbols or can constitute one 10-bit symbol. Other configurations are also possible.

Datalink Layer: The transmitter site 120 can use, for example, Reed-Solomon encoding for Forward Error Correction. LDC message length can be fixed or can be different from the $9^{th}$ pulse definition, which defines 24 symbols of five (5) bits each. By gathering groups of 5 bits over a period of time, receiver 110 can assemble a complete message. In an example, the Datalink Layer implementation can be encrypted. In another example, the Datalink Layer is not encrypted. In an example, the Reed-Solomon code can be used in the acquisition phase to gain synchronization to the message stream. This can be done without knowing the actual message content.

Message Layer

Figure 5:
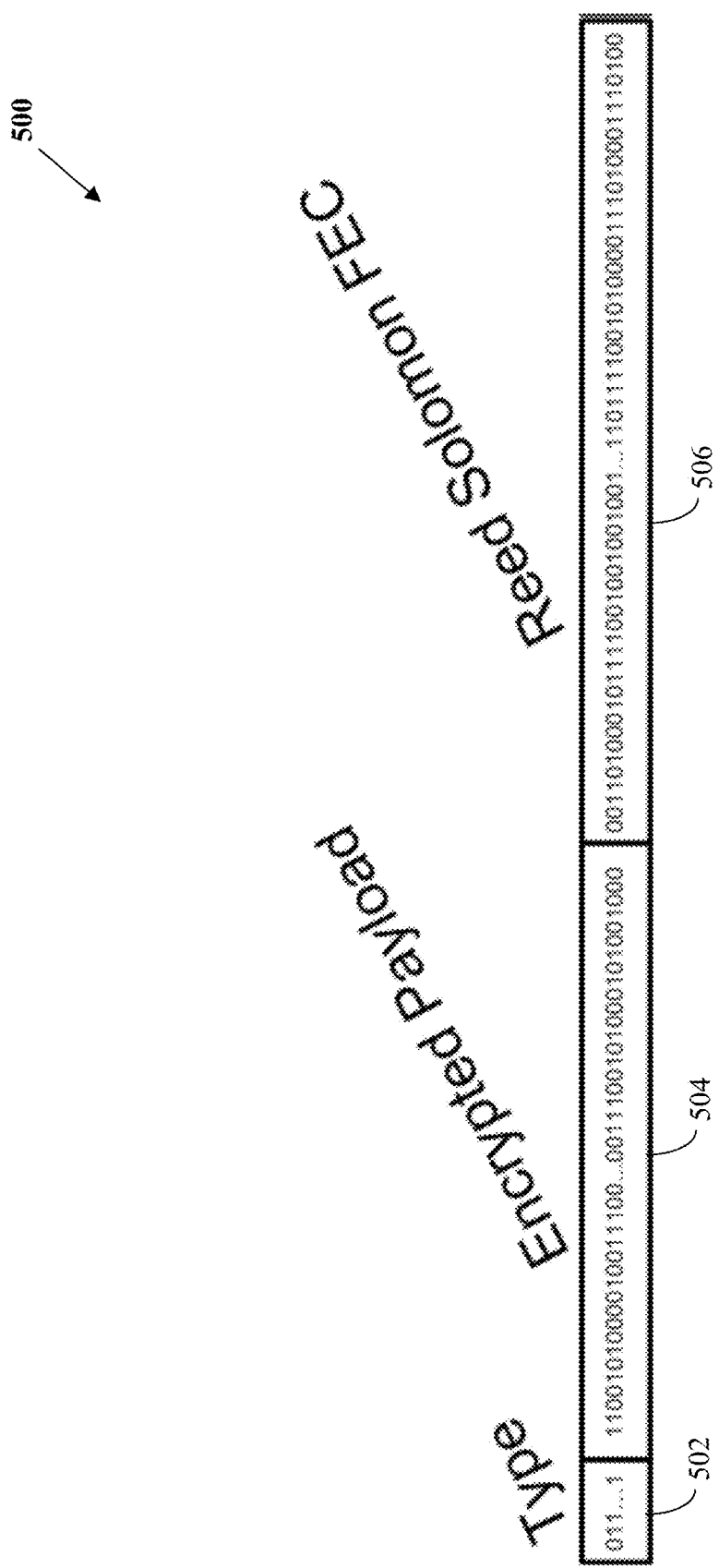
FIG. 5 is an illustration of an encrypted LDC message according to implementations of this disclosure.

FIG. 5 is an illustration of an encrypted LDC message 500 according to implementations of this disclosure. The encrypted LDC message 500 can include a type 502, an encrypted payload 504, and a Reed-Solomon forward error correction 506. The type 502 and the Reed-Solomon forward error correction 506 can be as described above with respect to the Data Channel Function. The Type 502 and Reed-Solomon forward error correction 506 are not part of the encrypted data. Only the payload included in the encrypted payload 504 of messages is encrypted.

The encrypted Loran Data Channel (LDC) can carry relevant information that receiver devices can use to, for example, acquire the Encrypted Private eLoran signals, calculate position, determine UTC, and receive Data and Transmission Encryption Keys for future times for all transmitters in the Private eLoran system. The Encrypted Loran Data Channel can adhere to the eLoran LDC standardized modulation, but can use different Forward Error Correction, message types and content. For example, the data channel can carry, among others: UTC messages that are necessary to determine accurate time; Private eLoran Almanac messages with transmitter locations, differential reference station information and system configuration data; Transmitter and system health and status messages; Transmission Encryption Key messages for this and other transmitters; Data Encryption Key messages for the transmitter site from which the message is received and/or other transmitter sites; Differential eLoran Correction messages from the Differential eLoran Reference Stations in the coverage area; and Third-party (e.g., government) data messages. The encrypted LDC can carry encrypted data (i.e., data that is encrypted by the eLoran encoder 213) from third parties (e.g., the Third-party data 208).

The transmitter site 120 can transmit private LDC messages. A private LDC message can include a message number and a message payload. A message number can indicate to a receiver 110 that the message payload includes the transmission key. In an example, the transmission key can be used starting, for example, the next transmission period. In an example, the message payload can include usage information for the transmission key. Usage information can indicate, for example, when a receiver can start using the transmission key to calculate arrival times of timing signals. For example, the usage information can indicate a future transmission period indicating when the transmitter starts transmitting according to, and the receiver to start receiving according to, the transmitted transmission key. The future transmission period can be indicated in relative or absolute terms. For example, the payload can indicate that the transmission key is to be used starting at the $200^{th}$ transmission slot from the transmission that included the PRG seed (i.e., relative transmission number). In another example, the payload can indicate that the transmission key is to be used starting at transmission number 900 (i.e., absolute transmission number).

In an example, the transmission key can be received from the Third-party data 208. In another example, a transmission site can receive a command from a control center, such as the control center 130 to transmit a new transmission key. In an implementation, the eLoran encoder 213 of FIG. 2, and as described above, can control and generate the keys. The eLoran encoder 213 can automatically generate keys. The eLoran encoder 213 can also generate keys in response to receiving a command (i.e., a command for a new set of keys) from the monitor and control unit 218.

In an implementation, the message payload can be encrypted. For example, the eLoran encoder 213 can encrypt the message payload. Advanced Encryption Standard (AES) encryption can be used to encrypt the message payload. For example, AES encryption using 128-bit keys and 128-bit block sizes, either in counter (CTR) or cipher block chaining (CBC) mode, or other mode can be used.

In an implementation, the encryption key can be changed regularly. For example, a system configuration can indicate the frequency of key change. In an implementation, control center 130 can issue to the transmitter sites 120 a command to transmit a new encryption key, a command including a new encryption key, or any combination thereof. In an implementation, a transmitter site 120 can regularly connect to a secure server to receive an instruction to transmit a new encryption key. In an implementation, the encryption key of a transmitter site 120 can be distributed through the LDC of the transmitter site 120. In an implementation, the encryption keys for other transmitter sites 120 of the system 100 can be distributed through each or some transmitter sites 120. The transmission of an encryption key can include the encryption key, a start time for using the encryption key, and the duration of validity of the encryption key, or any combination thereof. In an implementation, other, more, or less information regarding the encryption key can be transmitted. In an implementation, the eLoran encoder 213 can receive the command to generate and transmit an encryption key or can receive the encryption key from the control and monitor unit 218. The eLoran encoder 213, accordingly, causes an LDC message to be scheduled to transmit the encryption key in an encoded message.

An authorized receiver 110 with no valid LDC encryption key can acquire the encryption key. In an implementation, the receiver 110 can acquire the encryption key through the LDC of a neighboring transmitter site 120. In another implementation, the receiver 110 can acquire the encryption key through a secure connection to a Private eLoran key server (on a secure network controlled by the Private eLoran Service operator). In an implementation the encryption key can be delivered to the authorized receiver via alternative means. In an implementation, the alternative means can be another frequency (e.g., 300 kHz, 600 kHz, etc.), another medium (e.g., microwave), or the like. Other implementations are available.

The transmission key (for the Time Slot Allocation) can be sent regularly to increase the acquisition of authorized receivers. In an implementation, the current transmission key is transmitted for instance once per minute. However, the frequency of transmission of transmission keys and encryption keys can be configurable. For example, the eLoran encoder 213 of FIG. 2 can perform this function and can be configurable so that the validity of the keys can be set by the service provider. The frequent changes of the transmission key protect, for example, against system compromise or receiver theft. In an implementation, the operator of the system 100 can decide to change the transmission key and encryption key, and distribute the new transmission key and encryption key only through, for example, a secure network. In an implementation, the transmission key can be delivered to the authorized receiver via alternative means. In an implementation, the alternative means can be another frequency (e.g., 300 kHz, 600 kHz, etc.), another medium (e.g., microwave), or the like.

In an implementation, encryption of signals and data can be changeable (i.e., not fixed). A benefit of such an implementation is that, if the encryption keys are compromised, the system can be reconfigured using new keys.

In some implementations, all transmission sites in a GRI can be configured to transmit signals at pseudo-random times. In other implementations, less than all the transmission sites in a GRI can be configured to transmit at pseudo-random times. The transmission stations not configured to transmit at pseudo-random times can transmit at times synchronized to UTC. For example, and referring to FIG. 4, if the transmission site M is configured to transmit at pseudo-random times, then the transmission site transmits at the times 418 and 424. Whereas if the transmission site X is not configured to transmit at a pseudo-random time, then the transmission site X transmits at the time 412. The transmission key can be transmitted in the LDC of one or more of the transmission sites configured to transmit at pseudo-random times but not in the LDC of transmission sites configured to transmit at times synchronized to UTC. In some implementations, transmission sites can combine UTC synchronized and pseudo-random transmissions.

The Receiver

Figure 6:
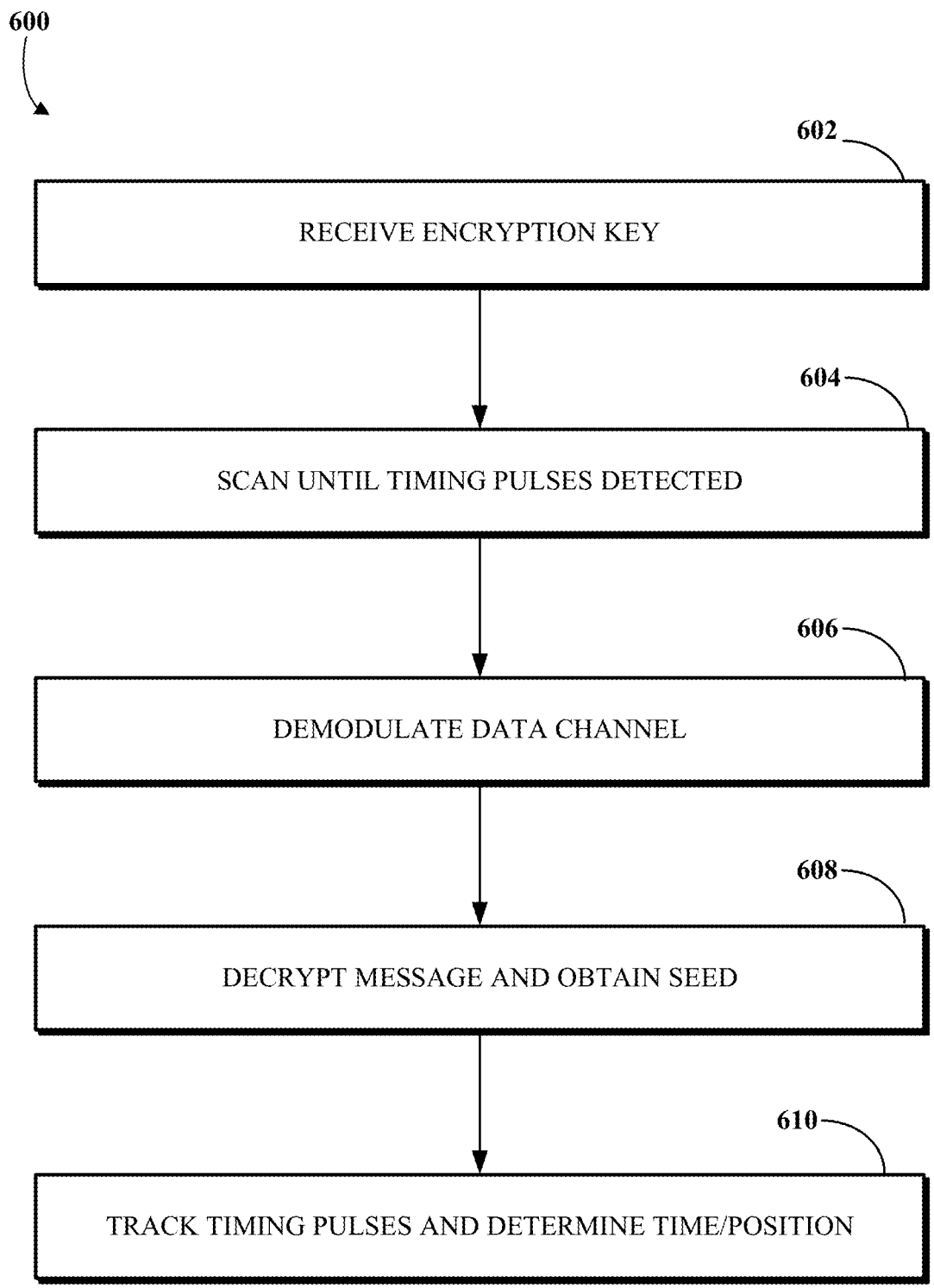
FIG. 6 is a flowchart of the operation of an authorized receiver according to implementations of this disclosure.

FIG. 6 is a flowchart 600 of the operation of an authorized receiver. eLoran receivers, to be used with the private eLoran, such as the system 100 of FIG. 1, can be standard eLoran receivers with the additional capabilities of: 1) the timing algorithm (equation 2) to calculate the starting time of the transmission slot, and 2) an ability to decrypt the LDC in order to read a transmission key to be used with the timing algorithm, and other encrypted messages. A receiver, such as the eLoran receiver 300 of FIG. 3, can include the same algorithm for calculating the next transmission slot as the transmitter sites 120. A receiver, to be authorized to use the system, must minimally have the encryption key of the encrypted LDC.

At 602, the receiver can receive (i.e., obtain) an encryption key. The receiver can use the encryption key to decrypt the data channel and read the transmission key. In an implementation, receiver 110 can obtain the encryption key by connecting to a secure network, to a key server, to a virtual private network, or the like. Receiver 110 can have the encryption key built into its memory. For example, the encryption key may be built into the receiver at manufacture time (e.g., at the factory). In an implementation, the encryption key can be entered into the receiver through human interface components of the receiver. For example, at a depot or a customer site, a user (e.g., a user with appropriate security privileges) can enter the encryption key into the receiver via a keyboard. In an example, the encryption key can be received by the receiver over the air.

At 604, an authorized receiver (such as, for example, a receiver that has the LDC encryption key) that does not yet have the transmission key (and, therefore, cannot determine the exact time of the transmissions of the timing pulses), continues to scan thru time until it detects, e.g., the eight timing pulses from a transmitter.

At 606, upon detecting the eight timing pulses, receiver 110 can then demodulate the two data pulses. In some implementations, transmitter site 120 can transmit more than eight timing pulses in one timeslot. In an implementation, sixteen timing pulses can be transmitted, such as, for example, in the case of eLoran service based upon Loran-D. Other number of timing pulses can be transmitted consistent with an eLoran service. More or less data pulses and timing pulses can be transmitted as disclosed elsewhere. By comparing the data pulses against the time of the timing pulses, receiver 110 can demodulate the data. Once receiver 110 captures the data from the LDC, it determines whether it contains the transmission key.

If the LDC includes the transmission key, then receiver 110, at 608, decrypts it. Otherwise receiver 110 continues to scan for and read data pulses until it acquires and decrypts the transmission key. The data pulses will, at some point in time, contain the transmission key required by receiver 110 to calculate the exact start time of the transmission slot of the next pulses.

Once the transmission key is acquired, the receiver can start tracking, at 610, the timing pulses from multiple transmitters.

Figure 7:
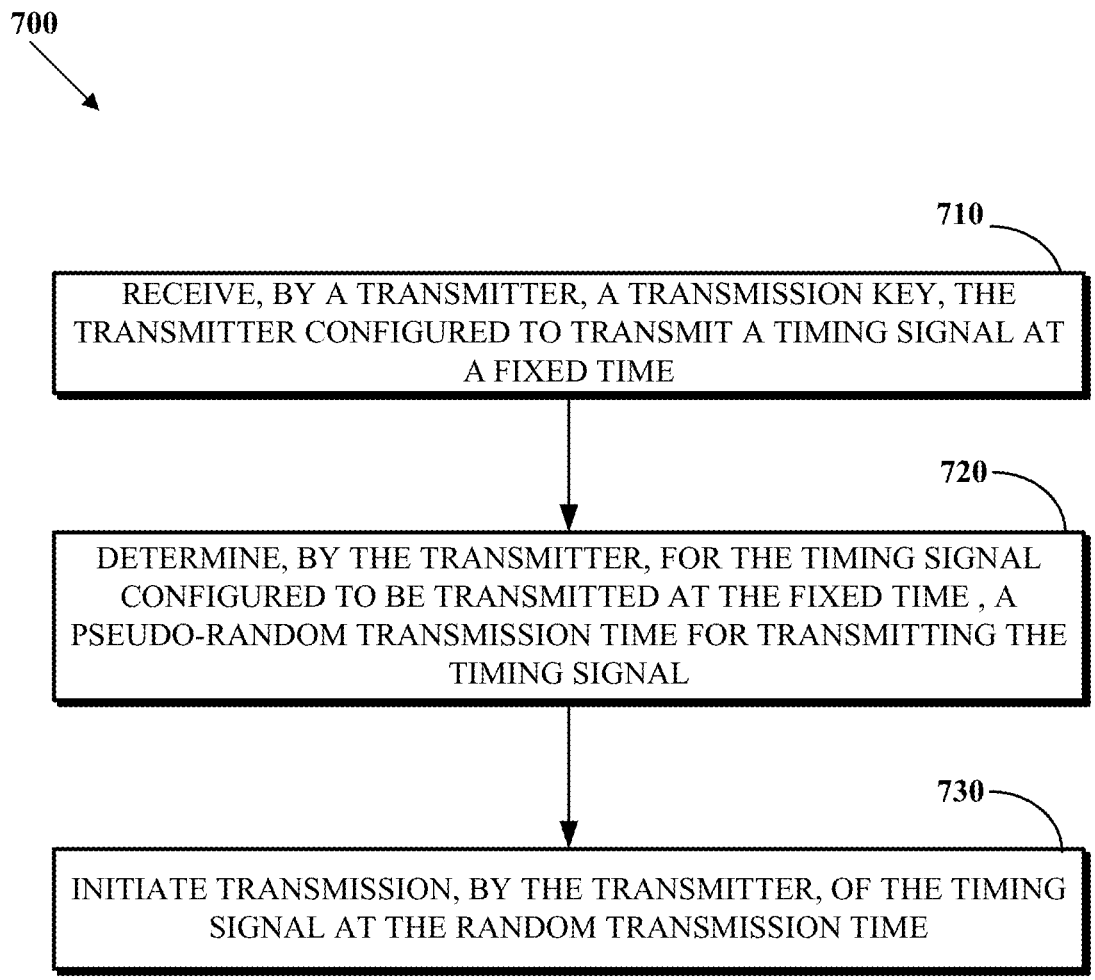
FIG. 7 is an example of a process for generating private eLoran signals according to an implementation of this disclosure.

FIG. 7 is an example of a process 700 for generating private eLoran signals according to an implementation of this disclosure. The process 700 can be implemented, for example, as a software program that can be executed by computing devices such as the transmitter site 120 of FIG. 1 or the system 200 of FIG. 2. The software program can include machine-readable instructions that can be stored in a memory or a secondary storage, and that can be executed by a processor, to cause the computing device to perform the process 700.

The process 700 can be implemented using specialized hardware or firmware. Some computing devices can have multiple memories, multiple processors, or both. The steps or operations of the process 700 can be distributed using different processors, memories, or both. Use of the terms "processor" or "memory" in the singular encompasses computing devices or components of a system that have one processor or one memory as well as devices that have multiple processors or multiple memories that can be used in the performance of some or all of the recited steps.

At 710, the process 700 can receive a transmission key. The transmission key can be received by a transmitter site. The transmitter site is configured to transmit a timing signal at a fixed time. The fixed time can be a time synchronized to Universal Time Coordinated (UTC) as described above with respect to the FIG. 4.

At 720, the process 700 determines, for the timing signal configured to be transmitted at the fixed time, a pseudo-random transmission time for transmitting the timing signal. For example, and referring to FIG. 4, instead of transmitting at Tx nominal (the time 412), the process 700 determines transmission time $T_{x,i}$ (the time 420) using the transmission key and the fixed time as described above. Pseudo-random transmission time in this context means that the transmission time cannot be predicted by an unauthorized user, but can be determined by authorized users who know the algorithm and algorithm parameters.

At 730, the process 700 initiates transmission of the timing signal at the pseudo-random transmission time. The transmission of the timing signal can be as described with respect to FIG. 2.

In some implementations, the process 700 can include transmitting the transmission key to a receiver device, such as the receiver 110 of FIG. 1 or the eLoran receiver 300 of FIG. 3. The transmission key can be transmitted to a receiver device in the data channel of the transmission. In an example, the process 700 can encrypt the transmission key before transmitting in the data channel. As such, the data channel can include the encrypted transmission key. The process 700 can be configured to complete a transmission in a timeslot having a start time being the fixed time and an end time. As such, determining a transmission time can include determining a transmission time such that transmission completes within the timeslot.

Figure 8:
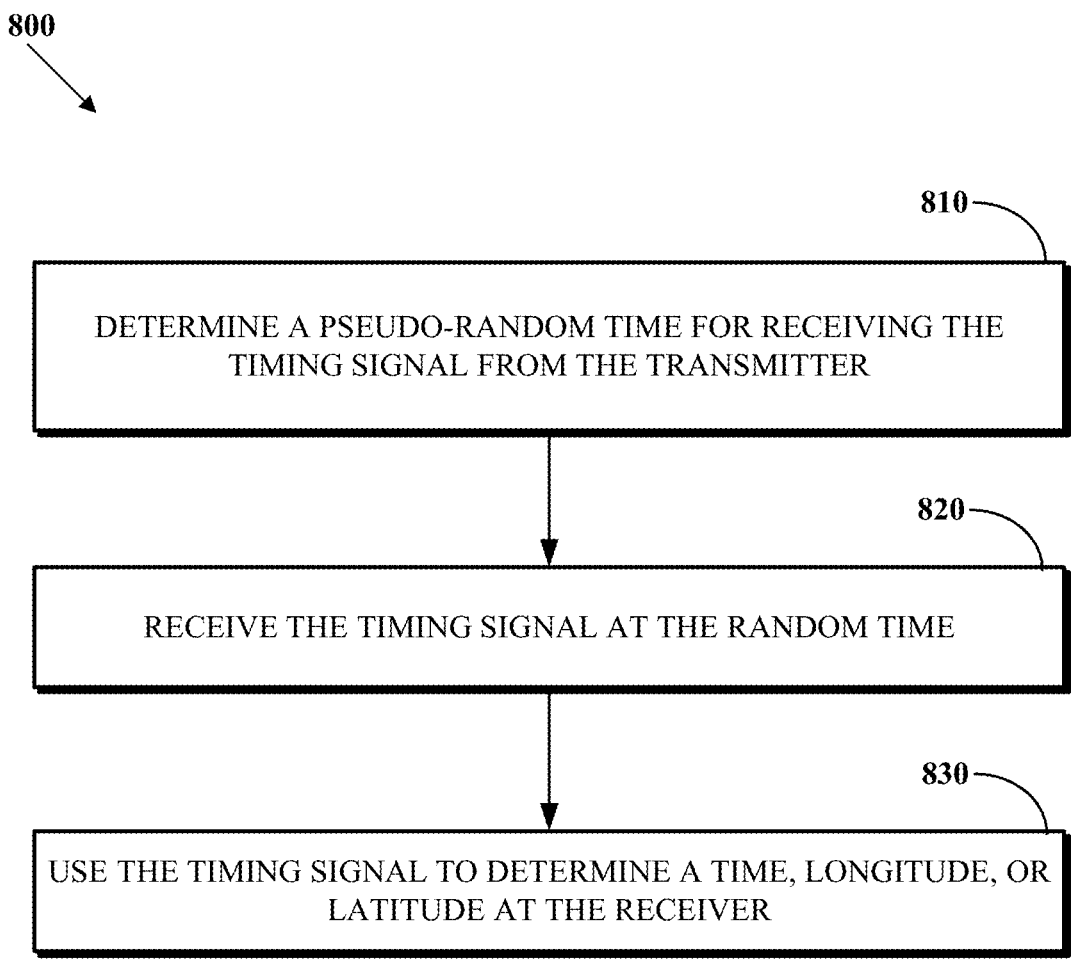
FIG. 8 is an example of a process for receiving private timing signals according to an implementation of this disclosure.

FIG. 8 is an example of a process 800 for receiving private timing signals according to an implementation of this disclosure. The process 800 can be implemented, for example, as a software program that can be executed by a receiver device such as the receiver 110 of FIG. 1 or the eLoran receiver 300 of FIG. 3. The software program can include machine-readable instructions that can be stored in a memory or a secondary storage, and that can be executed by a processor, to cause the receiver device to perform the process 800.

The process 800 can be implemented using specialized hardware or firmware. Some computing devices can have multiple memories, multiple processors, or both. The steps or operations of the process 800 can be distributed using different processors, memories, or both. Use of the terms "processor" or "memory" in the singular encompasses computing devices or components of a system that have one processor or one memory as well as devices that have multiple processors or multiple memories that can be used in the performance of some or all of the recited steps.

The receiver device can receive standard (i.e., open-access) eLoran signals from a transmitter site. That is, the receiver device can receive timing signals that are synchronized to the UTC. The receiver device can also be configured to receive private eLoran signals. The receiver device can be configured to receive signals from multiple transmitter sites at respective fixed times of the transmitter sites.

At 810, the process 800 can determine a pseudo-random time for receiving the timing signal from the transmitter site. The process 800 can determine a respective random time for all or less than all of the transmitter sites that the receiver device, configured to execute the process 800, receives signals from. The process 800 can use the fixed time to determine the random time. For example, the random time can be determined using steps consistent with those described with respect to FIG. 4.

At 820, the process 800 can receive the timing signal at the random time. At 830, the process 800 can use the timing signal to determine one or all of a time, longitude, or latitude. For example, the UTC time can be determined using the timing signal. For example, the timing signals from multiple transmitter sites can be used to determine the longitude and/or the latitude of a receiver receiving the timing signals. That is, the process 800 can determine positioning, timing, and/or navigation (PNT) information. The process 800 can use the timing signal, in conjunction with timing signals received from other transmitter sites to determine the PNT.

As described above, a transmitter site can operate in one or more GRIs, each having a respective nominal group repetition intervals. As such, in an implementation, an authorized receiver, such as the receiver 110 of FIG. 1 or the eLoran receiver 300 of FIG. 3, executing the process 800, can use timing signals from transmitter sites in different GRIs to determine time, position and/or navigation information.

In an example, determining the random time includes determining the random time using a transmission key. The transmission key can be the PRG seed as described above. The process 800 can obtain the transmission key by connecting to a secure network, to a key server, to a virtual private network, or the like. A receiver device can have the transmission key built into its memory. In an implementation, the process 800 can receive the transmission key in the LDC of a transmission from a transmitter site. As such, the process 800 can extract the transmission key from the data channel of a signal transmitted by the transmitter site. The process 800 can extract the transmission key from the data channel of a signal transmitted by the transmitter site by steps including searching the signal space for an eLoran signal to acquire the data channel of the signal transmitted by the transmitter site.

In an implementation, the process 800 can receive an encrypted transmission key. In such an implementation, receiver 110 can use a decryption key to decrypt the data channel and read the transmission key. Once a receiver device that is executing the process 800 has the transmission key, the receiver device can calculate the arrival of the next time slot of the encrypted timing signal from a particular transmitter site.

The receiver device can receive the decryption key at configuration time. For example, the decryption key can be obtained by connecting to a secure network, to a key server, to a virtual private network, or the like. The receiver device can have the decryption key built into its memory.

In an implementation, each transmitter site can use its own transmission key (i.e., PRG seed). As such, the receiver device acquires the transmission keys of each of the transmitter sites that the receiver device is receiving transmissions from (i.e., the transmitter sites in a GRI). In another implementation, the transmitter sites in a GRI can use the same transmission key. As such, a receiver device can acquire only one transmission key. As such, a transmitter site can calculate and discard values of the Pseudo-Random Transmission Slot Allocation that do not correspond to the transmitter site's transmission time. For example, a transmitter site A in a GRI of N transmitter sites and which is the $n^{th}$ transmitter site in the GRI, can calculate and use (i.e., for calculating the offset $\Delta_{prt\ A,i}$ according to equation 2) $PRG_A$(i) every ((i*N)+n) where i is the transmission number. Every other $PRG_A$(i) calculated by the transmitter site can be discarded. In another example, a calculated $PRG_A$(i) value can be used by all transmitter sites in a GRI during a group repetition interval. As such, and referring to FIG. 4, the times 440-444 can be the same, but the time 446 can be different from the times 440-444.

The pseudo randomness of the transmission slots, as described herein, can make a high power jammer ineffective if the jammer transmits outside of the transmission slot of a transmitter site. Spoofing or jamming of eLoran signals, transmitted and received as described herein, requires accurate knowledge of the exact transmission times. Without the transmission key and/or the encryption key used to encrypt a transmission key, transmission time calculation and LDC decryption may be virtually impossible. As such, spoofing Private eLoran is virtually impossible.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for generating private eLoran signals, comprising:
receiving, by a transmitter, a transmission key, wherein the transmitter is configured to transmit a transmission at a fixed time;
determining, by the transmitter, a pseudo-random transmission time for transmitting the transmission, wherein the pseudo-random transmission time is determined using the transmission key; and
initiating transmission, by the transmitter, of the transmission at the pseudo-random transmission time.

2. The method of claim 1,
wherein the transmitter is configured to transmit the transmission within a time slot,
wherein the time slot comprises a nominal start time, and
wherein the pseudo-random transmission time is offset from the nominal start time.

3. The method of claim 2, wherein a first length of a first time slot of a first transmission is different from a second length of a second time slot of a second transmission.

4. The method of claim 1, further comprising:
transmitting, by the transmitter to a receiver device, the transmission key.

5. The method of claim 4, wherein the transmission comprises a data channel, and wherein transmitting, by the transmitter to the receiver device, the transmission key comprises:
transmitting the transmission key in the data channel.

6. The method of claim 1, further comprising:
selecting an obscurity level by setting a random time offset, wherein the selecting the obscurity level degrades a positional accuracy determined by a receiving device of the transmission.

7. The method of claim 1, wherein the transmission key is a first transmission key, further comprising:
receiving, by the transmitter, a second transmission key, wherein the second transmission key is provided to a first receiver device and a second receiver device continues to use the transmission key,
wherein the second transmission key enables the first receiver device to obtain accurate timing or location information, and
wherein the second receiver device no longer obtains accurate timing or location information.

8. A system for transmitting private eLoran signals, the system comprising:
an encoding unit configured to:
determine a pseudo-random transmission time for a transmission wherein the system is configured to transmit the transmission within a time slot, and
wherein the pseudo-random transmission time is such that the transmission completes in the time slot; and
a transmission unit configured to:
transmit the transmission at the pseudo-random transmission time.

9. The system of claim 8, wherein the time slot comprises a start time; and
wherein the pseudo-random transmission time is offset from the start time.

10. The system of claim 8, wherein the transmission comprises an encrypted data channel.

11. The system of claim 8, wherein the encoding unit is further configured to:
determine the pseudo-random transmission time using a transmission key.

12. The system of claim 11, wherein the transmission unit is further configured to:
transmit, to a receiving device, the transmission key.

13. The system of claim 12, wherein the transmission comprises a data channel, and wherein to transmit, to the receiving device, the transmission key comprises to:
transmit the transmission key in the data channel.

14. A receiving device, comprising:
a processor configured to:
obtain a pseudo-random time for receiving a transmission from a transmitter;
receive the transmission at the pseudo-random time; and
use the transmission to determine at least one of a time, a longitude, or a latitude at the receiving device.

15. The receiving device of claim 14, wherein to obtain the pseudo-random time for receiving the transmission from the transmitter comprises to:
obtain the pseudo-random time using a transmission key.

16. The receiving device of claim 15, wherein to obtain the transmission key comprises to:
extract the transmission key from a data channel of a signal transmitted by the transmitter.

17. The receiving device of claim 15, wherein the transmission key is input in the receiving device.

18. The receiving device of claim 16,
wherein the receiving device is configured to receive transmissions from a transmitting station, and
wherein the receiving device does not obtain accurate timing or location information using the transmission key in a case that the transmitting station no longer using the transmission key.

19. The receiving device of claim 16, wherein the processor is further configured to:
receive a decryption key; and
decrypt the transmission key.

20. The receiving device of claim 16, wherein to extract the transmission key from the data channel comprises to:
search a signal space for an eLoran signal to acquire the data channel of the transmission transmitted by the transmitter.

* * * * *